Patented Dec. 25, 1934

1,985,368

UNITED STATES PATENT OFFICE 1,985,368

PLASTICIZER

Arthur H. French and Lowell O. Gill, Decatur, Ill., assignors to A. E. Staley Manufacturing Company, Decatur, Ill., a corporation of Illinois No Drawing. Application September 23, 1932, Serial No. 634,619

2 Claims. (Cl. 91—68)

This invention relates to plasticizers, and while it has more particular reference to the provision of a plasticizer or water soluble softener for the coating of paper, it will be readily apparent that the invention has other valuable application and uses.

Prior to the instant invention the use of glycerin, ethylene glycol, and similar products as plasticizers had been known. Where such plasticizers, however, have been employed in the coating of paper, particularly where employed in the provision of a greaseproof coating for paper, it has been found that the plasticizing effect is of temporary benefit because the plasticizing material has tended to migrate to the surface of the coating and be absorbed into the paper. These tendencies are overcome in the instant invention by incorporating with the major plasticizing material, i. e. the glycerin, ethylene glycol or similar compound, a quantity of starch gelatinized with and forming with the glycerin a sticky plastic mass which may be diluted with more glycerin or with water to give the desired plasticity to the product. If desired, corn syrup also may be incorporated to give body and increase the permanent plasticity.

The plasticizer embodying the present invention may be manufactured by heating approximately 30 parts of starch in 100 parts of glycerin to approximately 190° C., at which temperature the starch gelatinizes. The resulting composition may be employed alone or may be thereafter mixed with corn syrup, typically in the amount of 25 parts of corn syrup to the 30 parts of starch and 100 parts of glycerin.

The plasticizer so produced and generally of such mixture of ingredients is particularly valuable in the treatment of papers and readily serves as an under coating between the paper and the over coating, particularly where such over coating is of a greaseproofing character. By reason of the circumstance that the plasticizer embodying the instant invention does not tend markedly to migrate to the surface of the over coating lesser amounts of plasticizer may be employed.

It is thought that the invention and many of its attendant advantages will be understood from the foregoing description, and it will be apparent that various changes may be made in the ingredients described and their percentages without departing from the spirit and scope of the invention or sacrificing all of its material advantages, the ingredients and percentages hereinabove described being merely a preferred embodiment thereof.

We claim:

1. The method which comprises heating a mixture of glycerin and starch to a temperature sufficiently high to gelatinize the starch in the presence of the glycerin, applying the heated mixture to a paper product to form a plastic layer thereon, and applying over said plastic layer a layer of greaseproof material.

2. A paper product having a plastic layer of a preheated mixture of starch and non-migrating glycerin, and a layer of a greaseproof material covering said plastic layer.

ARTHUR H. FRENCH.
LOWELL O. GILL.